United States Patent [19]
Alderliesten et al.

[11] Patent Number: 5,846,592
[45] Date of Patent: Dec. 8, 1998

[54] LOW FAT SPREAD

[75] Inventors: Leendert Alderliesten, Zwijndrecht; Johannes Mateus Maria van Amelsvoort, Dordrecht; Wilhelmus Adrianus M. Castenmiller, Vlaardingen; Nanneke Joke de Fouw, Delft; Ronald Albert Schotel, Vlaardingen; Jozephus Johannes Verschuren, Poortugaal, all of Netherlands

[73] Assignee: Van Den Bergh Foods Co., Division of Conopco, Inc., Lisle, Ill.

[21] Appl. No.: 428,234

[22] PCT Filed: Oct. 28, 1993

[86] PCT No.: PCT/EP93/03010

§ 371 Date: Jun. 15, 1995

§ 102(e) Date: Jun. 15, 1995

[87] PCT Pub. No.: WO94/09048

PCT Pub. Date: May 11, 1994

[30] Foreign Application Priority Data

| Nov. 2, 1992 | [EP] | European Pat. Off. | 92203355 |
| Jan. 13, 1993 | [EP] | European Pat. Off. | 93200077 |
| Mar. 11, 1993 | [EP] | European Pat. Off. | 93200705 |
| Mar. 17, 1993 | [EP] | European Pat. Off. | 93200771 |
| Mar. 17, 1993 | [EP] | European Pat. Off. | 93200772 |
| Mar. 25, 1993 | [EP] | European Pat. Off. | 93200867 |
| Jul. 26, 1993 | [EP] | European Pat. Off. | 93202200 |

[51] Int. Cl.$^6$ ........................... A23L 1/052
[52] U.S. Cl. ........................... 426/602; 426/550
[58] Field of Search ........................... 426/602, 550, 426/601

[56] References Cited

U.S. PATENT DOCUMENTS

| 4,042,714 | 8/1977 | Torres | 426/557 |
| 5,106,644 | 4/1992 | El-Nokaly | 426/611 |
| 5,296,245 | 3/1994 | Clarke | 426/577 |
| 5,468,512 | 11/1995 | Verschuren | 426/580 |

FOREIGN PATENT DOCUMENTS

| 237120 | 9/1987 | European Pat. Off. . |
| 298561 | 1/1989 | European Pat. Off. . |
| 337889 | 10/1989 | European Pat. Off. . |
| 355908 | 2/1990 | European Pat. Off. . |
| 43235 | 6/1991 | European Pat. Off. . |
| 509707 | 10/1992 | European Pat. Off. . |

OTHER PUBLICATIONS

Patent Abstracts of Japan, vol. 16, No. 106, (C–919), Mar. 16, 1992, & JP A,03 280 857, 11 Dec. 1991 see abstract.
Patent Abstracts of Japan, vol. 16, No. 106 (C–919), Mar. 16, 1992, & JP A,03 280 856, 11 Dec. 1991 see abstract.

*Primary Examiner*—Carolyn Paden
*Attorney, Agent, or Firm*—Cushman Darby & Cushman IP Group Pillsbury Madison & Sutro LLP

[57] ABSTRACT

A spread is disclosed to contain a fiber ingredient which is non-degradable by enzymes secreted by the human body. The fiber ingredient is a non-starch polysaccharide having an average molecular weight of more than 800 and at least 10 st %, based on the weight of the fibers of soluble fibers.

5 Claims, No Drawings

2

LOW FAT SPREAD

BACKGROUND OF THE INVENTION

The present invention relates to spread products, in particular to spreads of the margarine type which contain fiber ingredients.

Many attempts have been made to formulate healthy spread products.

One possible route is to adapt the fatty acid composition of spreads. This has for example been done in spreads containing high levels of polyunsaturated fatty acids.

Another route is to reduce the fat content of spreads, leading to products of 40 wt % of fat or less.

EP 509 707 discloses low fat spreads containing a combination of water soluble starch, alginate and an ion source. Spreads according to this document may optionally contain 1 to 15% of a soluble vegetable fiber.

WO 93/06744 (not published before the earliest priority date of this application) relates to compositions having a creamy structure and containing fructanes. Example 17 describes a spread with 15 wt % of inulin.

EP 532 775 (not published before the earliest priority date of this application) relates to foods with a reduced caloric content comprising a polyfructan. Example 17 discloses spreads with about 5% or 10% of polyfructan.

EP 538 146 relates to indigestible dextrins for use in various food products. It is said to be difficult to incorporate these dextrins in W/O emulsions like spreads.

In recent years there have been numerous attempts to formulate food products comprising fiber ingredients. For example it has been proposed to incorporate fiber ingredients in bakery products e.g. breakfast cereals. U.S. Pat. No. 4,564,525 discloses chocolate with inulin. U.S. Pat. No. 4,283,432 discloses beverages with inulin. FR 2,673,360 discloses inulin in bakery products.

SUMMARY OF THE INVENTION

In the formulation of food products containing fiber ingredients, a number of requirements must be full-filled:

(1) the food product should preferably be consumed by a significant part (preferably the majority) of the consumers on a regular basis; therefore the food product should be part of the day to day diet of the average consumer.

(2) the variation in daily intake between individual consumers should be relatively small to ensure a relatively uniform intake over the consumers.

(3) the fiber ingredient should not unduly influence the taste of the products; for this reason it is sometimes difficult to incorporate fiber ingredients into neutrally tasting food products (4) the fiber ingredient should not influence the appearance of the food product in an unacceptable manner, i.e. should not unduly change its colour etc;

(5) the rheology of the product should still be good after addition of the fiber ingredient;

(6) the total food product should provide the desired fiber functionality in the body, i.e the desired effects on blood lipids and in the gastro-intestinal tract.

Surprisingly it has now been found that fibers can advantageously be incorporated into spreads products whereby, —provided that a number of conditions are fullfilled—the resulting product has a good taste (not too sandy or having a pronounced off-taste), a good appearance (not shiny or dull and having the desired white/yellow colour), a good rheology (plastic, spreadable and good mouthfeel) and good functionality (fibers are not digested by the enzymes secreted by the human body, a great number of consumers are likely to consume the product on a daily basis and the daily intake per consumer is likely to provide the desired health effects and is not subject to undue variations leading to extreme intakes).

DESCRIPTION OF THE PREFERRED EMBODIMENTS

Accordingly the present invention to a spread containing one or more fiber ingredients, wherein:

(a) the total level of fiber ingredients is 18 wt % or more;

(b) the fiber ingredient is a non-starch polysaccharide having an average molecular weight of more than 800;

(c) the fiber ingredient is a non-starch polysaccharide wherein the sugar units are predominantly connected via links which are non-degradable by the enzymes secreted by the human body;

(d) the spread has a stress strain relation with a maximum stress occuring at a strain $\epsilon_{max}$ of 0.001 to 0.3, and a stress $\delta_{max}$ at a strain $\epsilon_{max}$ of 0.01 to 100 kPa and a ratio of the plastic stress $\delta_p$ to $\delta_{max}$ ($\delta_p/\delta_{max}$) of 0.1 to 0.95.

For the purpose of the invention the term fiber ingredient relates to a non-starch polysaccharide material which upon eating is non-digestible. In this context the term non-digestible relates to non-degradable by enzymes secreted by the human body. Sometimes the presence of bacteria in the human gut may nevertheless lead to the degrading of such non-digestible polysaccharides by the enzymes secreted by the bacteria.

Generally fiber ingredients exist in two classes, soluble and insoluble fibers, whereby soluble fibers are soluble in water at a level of more than 0.1 g/l at 100° C. and insoluble fibers not.

One test which has been proposed for determining the level of dietary fibers in food products is described in AOAC (Prosky, L. et al (1985) Determination of total dietary fiber in foods and food products, J. Assoc. Off. Analyt. Chem. 68, 677–679). Applicants however believe that although this test provides for most fiber ingredients a good result, for some fiber ingredients e.g. oligofructoses the test provides a value which is too low. Separate techniques specifically designed to measure these molecular species can then be used for obtaining more reliable results.

The preferred level of fiber ingredients in spread products is 18 wt % or more, more preferred 19 to 40 wt %, most preferred 20 to 35 wt %. These levels of fiber ingredients result, taking into account the average daily intake of spreads by consumers, in a daily intake of fibers which can result in the desired health effects.

Preferably at least 10 w/w% of the fiber ingredient is a soluble fiber, more preferred more than 30 wt % for example more than 50 wt % up to 100 wt %. The balance of the fibers will be insoluble fibers.

The fiber ingredient is a non starch polysaccharide. Depending on the type of polysaccharide the molecular weight can vary in a broad range, for example the non-starch polysaccharide can have an average molecular weight of more than 800 and less than 10,000,000. For some embodiments of the invention the lower end on this range is preferred, while for other embodiments higher molecular weights are preferred.

Suitable sugar units can be selected from all edible sugar for example glucose, fructose, mannose, ribose, xylose, sorbitol etc. The sugar units should be connected to each other via non-degradable links i.e. links that are generally not split by the enzymes secreted by the human body. Generally all linkages other than α-(1-4) and α-(1-6) linkages are non-degradable. Examples of non-degradable links are β-(1-4) links between two glucose units, β-(2-1) links between two fructose units and β-(1-2) links between a glucose and fructose unit.

Preferably at least 90%, more preferred more than 95% of the linkages in the non-starch polysaccharide are non-degradable. Most preferred 100% of the linkages are non-degradable by enzymes secreted by the human body.

Preferably the non-starch polysaccharides used in spreads of the invention are predominantly linear i.e. more than 75% of the sugar units is in the main chain of the polymer, more preferred more than 90%, most preferred about 100%.

For the purpose of the invention the following non-starch polysaccharides are especially preferred:
(1) Oligofructoses preferably containing mainly β-(2-1) linkages. Especially preferred oligofructoses are inulins;
(2) Poly-glucoses preferably containing mainly β-(1-4) linkages. Especially preferred polyglucoses are cellulose (or derivatives thereof), betaglucans and oligoglucoses e.g. indigestible dextrins;
(3) Mixtures thereof.

If oligofructoses are employed as the fiber ingredients they may not only contain fructose units, but also minor amounts of other monosaccharide units, such as those derived from glucose. Most preferred are materials containing one (terminal) glucose unit, the remaining groups mainly being fructose units. Also the oligofructose is preferably of the β-2,1 type, more specifically it is inulin which may be obtained from plants such as e.g. Compositae species and fructans obtained from various micro-organism as e.g. *Aspergillus sydowii*. Especially preferably inulin materials derived from Jerusalem artichoke of chicory are used. Preferably commercially available inulin materials like Raftiline or Fibruline are used. Other suitable oligofructoses are e.g. irisin and lycorisin.

Preferably the oligofructose contains less than 5% w.w. of mono- and disaccharides. Although a minor amount of chain branching in the oligofructose does not seem to affect performance, it is preferred that the oligofructose employed is substantially linear.

The weight average DP (degree of polymerisation) of the oligofructoses may vary in a broad range, for example it may be about 5, 8, 10, 15, 20, 25 up to about 35, 50, 75 or even 100. Corresponding values for the average molecular weight apply (molecular weight of one sugar unit is about 160). Hence the average molecular weight is preferably from 800 to 16,000.

Oligofructoses as described above generally consist of 100 wt % of soluble fiber.

If indigestible polyglucoses are used one preferred type of materials is cellulose or derivatives thereof. Examples of these materials are methylcellulose, hemicellulose, hydroxypropylmethylcellulose or other carboxy-celluloses. Preferred molecular weights for these materials are for example 1,000,000 to 10,000,000, for example about 6,000,0000. Celluloses are generally considered as 100 wt % insoluble fiber.

Other preferred indigestible polyglucoses have a lower molecular weight for example 800 to 1,000,000. Examples of these materials are betaglucans and indigestible dextrins mainly comprised of beta-(1-4) linkages. Examples of suitable materials and their method of preparing are described in EP 538 146. Generally these materials are partly soluble and partly insoluble, for example the weight ratio of soluble fiber to insoluble fiber may be 20:1 to 1:20, more general 5:1 to 1:5.

The Oil Phase

Spreads according to the invention are either fat-continuous or water-continuous and generally contain less than 80 wt % of an oil phase, more general less than 60 wt %, for. One embodiment of the invention relates to spreads which are (virtually) fat free. For the purpose of the invention a water-continuous spread is either fat-free or is an oil-in-water emulsion.

Throughout this specification the terms oil and fat are used interchangeably. They are meant to include triglycerides of natural or synthetic origin such as soybean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or di-saccharides, and that can be used as replacement for or in admixture with triglycerides.

Preferably the fat is present in the form of small fat globules or crystals, having a volume weighted mean diameter of less than 20 $\mu$m, more preferred from 0.1 to 5 $\mu$m, most preferred from 0.5 to 2 $\mu$m. The presence of these small fat particles in low fat spreads of the invention has the distinct advantage of providing an improved appearance to the product.

In a very preferred embodiment of the invention at least part of the fat is dairy fat. Preferably at least 10 wt % based on the total weight of the fat is dairy fat, more preferred more than 50 wt %, most preferred more than 90 wt % or even 100 wt %. The dairy fat can be derived from any dairy source.

Especially preferably the dairy fat is derived from dairy cream or cream cheese.

In another preferred embodiment of the invention the fat is derived from non-dairy creams.

In one preferred embodiment, spreads according to the invention comprise less than 20 wt % of fat, more preferred 0 to 10 wt %, for example 0.1 to 7 wt % or 1 to 3 wt %. Also spreads of the invention may be substantially free from fat or contain very low levels of fat (0.01 to 2 wt %).

Other ingredients

Spreads of the invention are used as bread spreads for the replacement of margarines or low fat margarines. Therefore the taste and appearance of spreads of the invention should be similar to margarines i.e. a non-sweet, fatty, bland taste and a white/yellow colour.

In addition to the above mentioned ingredients, spreads of the invention may comprise a number of optional ingredients such as flavouring, salt, preservatives, acidifiers, vitamins, colouring materials etc.

Preferably the level of flavouring materials (other than those which are incorporated through the dairy ingredients) is less than 0.5 wt %, for example 0.01 to 2 wt %. Preferably the level of salt (sodium chloride) is from 0–4 wt %, more preferred 0.1 to 3 wt %, most preferred 0.5 to 1.2 wt %.

Preservatives are preferably incorporated at a level of 0–4 wt %, more preferred 0.01 to 1 wt %, most preferred 0.05 to 0.3 wt %. Especially preferred is the use of potassium sorbate. A preferred colouring material is carotene; preferred levels of colouring material are from 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable acidifier is for example lactic acid or citric acid.

Spreads of the invention may further contain from 0.05 to 30 wt % of biopolymers other than non-starch polysaccharide fiber ingredients as defined above. Preferably the level is from 0.1 to 20 wt %. The biopolymers may be added as such or may for example be included in the form of commercially available fat-replacers.

Suitable biopolymer materials may for example be selected from starches and proteins. Preferably gelling biopolymers are used.

The preferred levels of biopolymers for obtaining optimum product properties (e.g. plasticity and/or non-thixotropy), generally depend on the type of biopolymer used. Also the preferred amount of biopolymers is dependant on the desired degree of thickening or gelling and the presence of other ingredients in the composition.

If starches are used as biopolymer material, preferably gelling starches are used. Especially preferred is the use of modified starches, for example hydrolysed starches such as Paselli SA2 (Avebe), Cerestar, Snowflake 01906 and N-lite (National starch). Also commercially available fat-replacers which are based on these biopolymer materials may be used, for example Stellar™. The level of (modified) starches is preferably 5 to 20 wt %, more preferred 6 to 17 wt %, most preferred 7 to 15 wt %; if the modified starches are used in combination with other biopolymer materials, their level may be lower for example 0.05 to 10 wt %.

If proteins are used as biopolymer material, preferably proteins are used as disclosed in EP 237 120 (incorporated by reference). Examples of suitable materials are gelatin, soy protein, milk protein etc. Especially preferred is the use of gelling proteins, most preferred is the use of gelatin. The level of (gelling) proteins is preferably from 0.05 to 10 wt %, more preferred 0.3 to 7 wt %, most preferred 0.7 to 5 wt %. Also commercially available fat replacers based on these materials may be used for example Simplesse™ or Dairy-lo™.

The spread may further (optionally although not preferably) contain small particles such as herbs and vegetables. The total level thereof will generally be less than 10 wt %.

Spreads of the invention will generally comprise fairly high levels of water, say from 20 to 80 wt % of the composition, more preferred 55 to 75 wt %, most preferred 60 to 70 wt %. Water may be incorporated as such, or as part of the other ingredients such as milk etc.

Product properties

The present invention provides water-continuous spreads being smooth, butter-like and low calorie which can be used with good results on sandwiches, bread etc e.g. to replace halvarines or margarine.

Spreads of the invention have improved properties for example relating to plasticity, hardness, non-thixotropy, gumminess and chewiness.

Preferably spreads of the invention are plastic in that it has a stress strain relation with a maximum stress occuring at a strain $\epsilon_{max}$ of 0.001 to 0.3, more preferred 0.01 to 0.3 and a stress $\delta_{max}$ at a strain $\epsilon_{max}$ of 0.01 to 100 kPa more preferred 0.3 to 60 kPa and a ratio of the plastic stress $\delta_p$ to $\delta_{max}$ ($\delta_p/\delta_{max}$) of 0.1 to 1, more preferred 0.1 to 0.95.

A suitable method for determining these parameters is described in EP 298 561. This can be done with a series of measurements using a parallel plate squeezing flow geometry. the measurements are carried out using a parallel plate plastometer (preferably an Instron™), wherein a block of the material to be tested is deformed between two parallel plates that move towards each other. the deformation is inflicted at constant rate preferably at a deformation of 0.0167 s$^{-1}$ (100% compression in 1 minute). The corresponding stress at increasing deformation (strain) is determined by recording the force that is required to keep the rate of deformation constant while the deformation magnitude increases. A series of measurements is carried out on a series of blocks of materials to be tested, having varying thicknesses. from these measurements the stress-strain relation of the material is obtained by extrapolating the results to infinits thickness. The stress is expressed in kPa and recorded as a function of the strain $\epsilon=\ln(H_o/H)$, $H_o$ indicating the thickness of the testblock before the measurement and H indicating the thickness during measurements. Suitably the stress strain relation-ship is determined at 5° C.

Occasionally, the above method does not provide a stress/strain relationship with a clear relative maximum stress $\delta_{max}$ at a strain $\epsilon_{max}$. Under these circumstances the above method for determining the stres/strain relationship should be repeated while decreasing the speed of measurement (e.g. 2–10 times slower). If this still not results in a clear maximum in the curve, then $\epsilon_{max}$ may be determined by determining the strain at the intersection of two tangents of the curve: (1) at $\epsilon=0$ and (2) at $\epsilon_p$.

Preferably spreads according to the invention also have an improved hardness. Preferably the Stevens value of the spreads is more than 50 g at 5° C., more preferably from 65 to 1000 g, most preferably 120 to 700 g. The Stevens value may be obtained by analyzing samples with a Stevens LFRA Structure Analyser (ex Stevens & Son Weighing machines Ltd, London EC 1V 7 LD, U.K) and using a 4.4 mm probe.

Preferably spreads in accordance to the invention also have a reduced degree of thixotropy. It is believed to be well within the ability of the skilled person to determine whether a spread is non-thixotropic. A suitable test for this purpose is to remove a portion of the spread from the tub with a knife, followed by spreading onto bread. A non-thixotropic spread retains its firmness during removal from the tub and spreading. A thixotropic spread is also relatively firm during removal from the tub, but looses its structure during spreading and regains its firmness after spreading.

Also preferably the aqueous phase of spreads of the invention have a preferred hardness, gumminess and chewiness as measured by TPA (texture profile analysis) or by CUC (Cycle until count). These methods are for example described by William M. Breene in Journal of Texture studies 6 (1975) 53–82. Suitably TPA and CUC measurements are done with a Stable Micro Systems model TA-XT2/25 kg using XT.RA Dimension V3.6 software, following the procedure as outlined in the Guidelines of the apparatus and software. Preferred settings are outlined in the Example.

Preferably aqueous phases of spreads according to the invention satisfy one or more of the following features as measured by TPA (force in compression mode):

(1) a hardness (force value corresponding to the first major TPA peak) of more than 1.2N, preferably 1.3 to 4.0N, most preferably 1.4 to 2.5N;

(2) a gumminess (hardness * cohesiveness) of more than 0.7, more preferred 0.75 to 2.0, most preferred 0.8 to 1.8;

(3) a chewiness (gumminess * springiness) of more than 0.7, more preferred 0.75 to 2.0, most preferred 0.8 to 1.8.

Preferably the aqueous phases of spreads according to the invention satisfy the following feature as measured by CUC (force in compression test, 40 seconds cycle time) the ratio of initial hardness to hardness at 260 seconds is less than 1.5, more preferred 1.0 to 1.45, most preferred 1.0 to 1.4.

It is believed that similar values for hardness, gumminess and chewiness apply to the complete spread products.

Preparation

Spreads of the invention may be prepared by any suitable method for the preparation of water-continuous spread products. A preferred method however involves the mixing of the ingredients, optionally followed by pasteurisation and homogenisation, followed by cooling in one or more scraped surface heat exchangers (A-units) to a temperature of 0 to 10° C., optionally followed by processing through one or more C-units.

After preparation the spreads are generally packed in wrappers or containers, generally tubs with a content of 2–1000 g will be used, especially 5, 10, 15, 250 or 500 g. Preferably the packed product is stored at refrigerator temperature.

Specific embodiments of the invention

One embodiment of the invention (see EP 93200867.5 one of the priority documents of this application) relates to a water-continuous spread comprising: 10 to 50 wt % of an oligofructose and 0.05 to 30 wt % of a biopolymer other than oligofructose and less than 20 wt % of an oil phase.

Another embodiment of the invention (see EP 93200771.9 one of the priority documents of this application) relates to a water-continuous spread comprising more than 15 wt % of oligofructoses and from 0.1 to 7 wt % of fat. Preferably the oligofructose is derived from jerusalem artichoke or chicory. Preferred levels of oligofructoses are 17 to 70 wt %, more preferred 20 to 50 wt %. Preferably at least 10 wt % of the fat is dairy fat e.g. derived from dairy cream, butter fat or cream cheese or fat derived from non-dairy cream.

A third embodiment (see EP 93200772.7 one of the priority documents of this application) relates to a water-continuous spread comprising more than 15 wt % of oligofructoses; and from 0.1 to 15 wt % of mono- or di-saccharides. Preferably the oligofructose is an inulin, preferably derived from Jerusalem artichoke or chicory.

Preferably the saccharide is a di-saccharide, preferably lactose or sucrose. The spread may conveniently contain from 0.5 to 7 wt % of fat which may for example be derived from a dairy source, preferably dairy cream or from non-dairy cream.

EXAMPLE 1

TPA measurements were carried out in Stable Micro Systems model TA-XT2/25 kg using XT.RA Dimension V3.6 software. The temperature of measurement was 5° C. A 12.7 mm steel probe was used, the speed was 0.4 mm/s, the penetration depth was 80% of the product, the product height was about 2 cm in a tub. A one second pause was held between the first and second peak.

The CUC measurements were made with the same apparatus, software, temperature and sample height in tub as indicated above. The speed was 0.2 mm/s, the penetration depth 4.0 mm (cycle time about 40 seconds).

Four test samples A–D were evaluated. Product A (comparison) was a spread of 25 wt % Raftiline LS in water. Product B was a spread with 25 wt % Raftiline LS and 35 wt % Stellar in water. Product C (comparison) was a spread of 33 wt % Raftiline LS in water; product D was a spread of 33 wt % Raftiline LS and 35 wt % Stellar in water.

The following results were obtained:

| TPA measurements Sample | hardness | gumminess | chewiness |
| --- | --- | --- | --- |
| A | 0.64 | 0.27 | 0.24 |
| B | 1.54 | 0.99 | 0.96 |
| C | 1.09 | 0.59 | 0.55 |
| D | 2.45 | 1.23 | 1.20 |

| CUC measurements Sample | hardness (N) t = 0 (peak 1) | gumminess (N) t = 260 (peak 7) | hardness$_{t=0}$/hardness$_{t=260}$ |
| --- | --- | --- | --- |
| A | 0.63 | 0.37 | 1.7 |
| B | 0.55 | 0.46 | 1.2 |

EXAMPLE 2

A fat free spread was prepared from the following ingredients:

| | |
| --- | --- |
| 33.0 parts | inulin (Raftiline LS |
| 1.5 parts | NaCl |
| 0.12 parts | potassium sorbate |
| 0.05 parts | B-carotene (1% water soluble solution) |
| 1 part | gelatin, 250 bloom (ex Geltech) |
| up to 100 parts water | |

All the ingredients were mixed together with the exception of inulin and then added to cold water. When the ingredients were completely dissolved the inulin was added slowly to the solution. The suspension was then mixed for 5 minutes with a high energy mixer [Ultra turrax (trade name) type TP 18/10]. During the mixing the pH was adjusted to 4.7 by adding a small amount of lactic acid. The mixture so obtained was filled in tubs, which were immediately stored in a refrigerator at 5° C. After one week storing the product was tested and showed a smooth texture and a very acceptable mouthfeel. The Stevens value of the product was determined and found to be 26. When shear was applied to the product less water was released than from a corresponding product without gelatin.

EXAMPLE 3

A spread was prepared from the following ingredients:

| | |
| --- | --- |
| 33.0 parts | inulin (containing mainly 2–60 fructose units) |
| 1.5 part | gelatin |
| 1 part | sunflower oil |
| 1.5 parts | NaCl |
| 0.12 parts | potassium sorbate |
| 0.05 parts | B-carotene (1% water soluble solution) |
| 1 part | Na-caseinate |
| trace spread flavour | |
| up to 100 parts water | |

All the ingredients were mixed together with the exception of inulin and then added to cold water. When the ingredients were completely dissolved the inulin was added slowly to the solution. The suspension was then mixed for 5 minutes with a high energy mixer [Ultra turrax (trade name) type TP 18/10]. During the mixing the pH was adjusted to 4.7 by adding a small amount of lactic acid. The mixture so obtained was filled in tubs, which were immediately stored in a refrigerator at 5° C. After one week storing the product was tested and showed a smooth texture and a very acceptable mouthfeel. The Stevens value of the product was determined and found to be 50. When shear was applied to the product less water was released than from a blank without gelatin. When shear was applied to the product less water was released than from a corresponding product without gelatin.

EXAMPLE 4

The following compositions were made by mixing the inulin into water of 65° C., cooling to 45° C. and mixing the remaining ingredients. All compositions contained 0.12 wt % potassium sorbate, 0.8 wt % NaCl, lactic acid to pH 4.8. the balance of the compostions was water. The NDC (non-dairy cream) had a fat content of 26.9 wt %. The cream had a fat content of 45 wt %.

| | Ingredient (wt %) | | | | |
|---|---|---|---|---|---|
| composition | Inulin | Stellar | gelatin | butter milk powder | ndc |
| A | 33 | 20 | — | — | — |
| B | 33 | — | 1 | 1 | — |
| C | 33 | 20 | 1 | — | — |
| D | 33 | 20 | — | 1 | — |
| E | 33 | 20 | 1 | 1 | — |
| F | 33 | 20 | 1 | — | — |
| G | 33 | 20 | 1 | — | 4 |
| H | 33 | 20 | 1 | — | 12 |
| I | 33 | 35 | — | — | 12 |
| J | 33 | 30 | — | — | 12 |
| K | 33 | 30 | 0.25 | — | 12 |
| L | 33 | 30 | 0.50 | — | 12 |
| M | 33 | 30 | 0.75 | — | 12 |
| N | 33 | 30 | 1 | — | 12 |

EXAMPLE 5

A spread of the following composition was prepared.

| Ingredient | wt % |
|---|---|
| Raftiline LS (*) | 30 |
| gelling starch (**) | 5 |
| cream (40% fat) | 7 |
| gelatin | 0.25 |
| CMC (7 mf ex Hercules) | 0.07 |
| NaCl | 0.8 |
| potassium sorbate | 0.2 |
| TiO2 | 0.2 |
| flavouring | 100 ppm |
| water | balance |
| pH | 5.2 |

(*) oligofructose ex Tiense Sulker raffinadery.
(**) A modified maltodextrin starch (6110 = 97-2 ex National Starch). This starch is a blend of modified food starches, having rheological properties as follows: $G'_{max}$ is 5.0 after complete dispersion in water (17.2%) and a log $G'_{max}$ of 4.7 (log of ½ G') at 6486 seconds after dispersion.

The method of preparation was as follows: The starch was solubilized in water at 85° C. and kept at this temperature for 10 minutes. The solution was cooled to 65° C. The CMC and 0.07% of the Raftiline LS were premixed and added. The mixture was further cooled to 60° C. the cream was added. The remaining ingredients except for the flavour were added at 600C. The pH was set to 5.2 using a 10% lactic acid solution. Finally the flavours were added.

EXAMPLE 6

A spread of the following composition was prepared.

| | wt % |
|---|---|
| fat (Trio Creme) | 65.2 |
| fibre (cellulose, pulversorte B) | 18.1 |
| lecithin (Bolec ZTD) | 2.12 |
| monoglyceride (Admul 6203) | 0.1 |
| β-carotene (0.4% in oil) | 0.1 |
| p-sorbate | 0.05 |
| NaCl | 0.4 |
| citric acid | to pH 4.8 |
| flavour | trace |
| water | balance |

The method of preparation was as follows: the cellulose was pretreated by ball-milling for 2.5 hours in the presence of half of the lecithin. A premix was prepared of the fat, fiber, lecithin, monoglyceride, carotene and flavour at 60° C. A second premix at 60° C. was prepared of the remaining ingredients.

The two premixes were mixed in a gear pump at $T_{out}$ 42° C., 1300 rpm, throughput 4.5 kg/hour, followed by processing in an A-unit ($T_{out}$ 18° C., 4 * 800 rpm) and a C-unit ($T_{out}$ 22° C., 300 rpm).

We claim:

1. A spread containing one or more fiber ingredients, wherein:

(a) the total level of fiber ingredients is 18 wt % or more;
   (b) the fiber ingredient is a non-starch polysaccharide having an average molecular weight of more than 800;
   (c) the fiber ingredient is a non-starch polysaccharide wherein the sugar units are predominantly connected via links which are non-degradable by the enzymes secreted by the human body;
   (d) the spread has a stress strain relation with a maximum stress occurring at a strain $\epsilon_{max}$ of 0.001 to 0.3, and a stress $\delta_{max}$ at a strain $\epsilon_{max}$ of 0.01 to 100 kPa and a ratio of the plastic stress $\delta_p$ to $\delta_{max}$ ($\delta_p/\delta_{max}$ of 0.1 to 0.95 and
   (e) the fiber ingredients comprise at least 10 wt % based on the weight of the fibers of soluble fibers.

2. Spread according to claim 1, wherein at least 90% of the linkages in the non-starch polysaccharide are other than α-(1-4) and α-(1-6) linkages.

3. Spread according to claim 1 or 2, wherein the non-starch polysaccharides are selected from the group consisting of oligofructoses, poly-glucoses and mixtures thereof.

4. Spread according to claim 3, wherein the oligofructose has a weight average DP of 5 to 100 and is an inulin.

5. Spread according to claim 3, wherein the polyglucose is a cellulose or derivative thereof, betaglucan or an oligoglucose.

* * * * *